(12) United States Patent
Iwamura et al.

(10) Patent No.: US 7,624,290 B2
(45) Date of Patent: Nov. 24, 2009

(54) POWER-SAVE CONTROL FOR NETWORK MASTER DEVICE

(75) Inventors: Ryuichi Iwamura, San Diego, CA (US); Robert Allan Unger, El Cajon, CA (US); Tohru Doumuki, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 479 days.

(21) Appl. No.: 11/231,488

(22) Filed: Sep. 20, 2005

(65) Prior Publication Data

US 2006/0218419 A1   Sep. 28, 2006

Related U.S. Application Data

(60) Provisional application No. 60/664,620, filed on Mar. 22, 2005.

(51) Int. Cl.
*G06F 1/26* (2006.01)
*G06F 1/32* (2006.01)

(52) U.S. Cl. .................. 713/320; 713/300; 713/310; 455/127.5; 455/574

(58) Field of Classification Search .......... 713/300, 713/310, 320; 455/127.5, 574
See application file for complete search history.

(56) References Cited

U.S. PATENT DOCUMENTS

| | | | | |
|---|---|---|---|---|
| 6,184,778 | B1 * | 2/2001 | Tsuji ................... 340/286.02 |
| 6,434,113 | B1 * | 8/2002 | Gubbi ..................... 370/216 |
| 6,704,584 | B2 * | 3/2004 | Litwin ..................... 455/574 |
| 6,807,580 | B2 * | 10/2004 | Freeman et al. .......... 709/249 |
| 6,826,606 | B2 * | 11/2004 | Freeman et al. .......... 709/223 |
| 6,876,850 | B2 * | 4/2005 | Maeshima et al. ...... 455/422.1 |
| 6,889,248 | B1 * | 5/2005 | Scheer ................... 709/209 |
| 6,922,724 | B1 * | 7/2005 | Freeman et al. .......... 709/223 |
| 6,941,350 | B1 * | 9/2005 | Frazier et al. ............ 709/209 |
| 6,961,306 | B2 * | 11/2005 | Ying ....................... 370/222 |
| 6,987,967 | B2 * | 1/2006 | Maeshima et al. ...... 455/422.1 |
| 7,245,947 | B2 * | 7/2007 | Salokannel et al. ....... 455/574 |
| 7,302,608 | B1 * | 11/2007 | Acharya et al. ............ 714/13 |
| 7,310,661 | B2 * | 12/2007 | Treister et al. ............ 709/208 |

(Continued)

OTHER PUBLICATIONS

Rios Carlos, Working Group for Wireless Personal Area Network (WPANs), IEEE 802.15-00/0197r2, Sep. 2000.

(Continued)

*Primary Examiner*—Thomas Lee
*Assistant Examiner*—Jaweed A Abbaszadeh
(74) *Attorney, Agent, or Firm*—Fitch, Even, Tabin & Flannery (57) ABSTRACT

A method, in accordance with one embodiment, of managing power consumption in a network, comprising receiving an instruction for a first device in an active power state and serving as a network master node to enter into a power management state, the network master node adapted to perform a network administrative function while in an active power state, the power management state having a lower power consumption than the active power state; sending data from the first device to a second device serving as a network slave node, the data enabling the second device to start performing the network administrative function while in an active power state; and placing the first device into the power management state after sending the data.

19 Claims, 6 Drawing Sheets

U.S. PATENT DOCUMENTS

| | | | |
|---|---|---|---|
| 7,359,950 B2 * | 4/2008 | Choi et al. | 709/209 |
| 7,421,471 B2 * | 9/2008 | Van Datta | 709/205 |
| 2002/0055978 A1 * | 5/2002 | Joon-Bo et al. | 709/209 |
| 2003/0195019 A1 * | 10/2003 | Litwin | 455/574 |
| 2003/0217158 A1 * | 11/2003 | Datta | 709/228 |
| 2003/0220076 A1 | 11/2003 | Katayama et al. | |
| 2004/0143654 A1 * | 7/2004 | Poirot et al. | 709/223 |
| 2004/0151149 A1 | 8/2004 | Song et al. | |
| 2005/0076127 A1 * | 4/2005 | Wilson et al. | 709/227 |
| 2005/0078682 A1 * | 4/2005 | Kim et al. | 370/395.5 |
| 2005/0164689 A1 * | 7/2005 | Maeshima et al. | 455/418 |
| 2005/0164697 A1 * | 7/2005 | Maeshima et al. | 455/420 |
| 2005/0262216 A1 * | 11/2005 | Kashiwabara et al. | 709/208 |
| 2006/0156344 A1 * | 7/2006 | Iwata et al. | 725/58 |
| 2006/0171329 A1 * | 8/2006 | Ying | 370/254 |

OTHER PUBLICATIONS

PCT International Search Report and Written Opinion of the International Searching Authority, PCT/US 06/08630, mail date: Aug. 13 2007, pp. 1-7.

International Preliminary Report on Patentability WO06101775 (86613pct) issued Sep. 25, 2007.

* cited by examiner

POWER-SAVE CONTROL FOR NETWORK MASTER DEVICE

This application claims the benefit of U.S. Provisional Application No. 60/664,620, filed Mar. 22, 2005, which is incorporated herein by reference in its entirety.

BACKGROUND OF THE INVENTION

1. Field of the Invention

The present invention relates generally to networks, and more specifically to home networks employing devices which incorporate power management systems.

2. Discussion of the Related Art

Power management is desirable for home networks because a typical network appliance can consume several hundred watts of power per hour when it is turned on, whether or not it is performing its nominal, non-network functions. Such extraneous energy consumption can be quite expensive.

Currently in home networks, a network master node must perform network administrative functions even when it is not performing its nominal, non-network functions. From an energy conservation standpoint, it is generally desirable for a device that is not performing its nominal device functions to enter into a power management (e.g., power save) mode. Indeed, Energy Star (EStar) guidelines, issued by the U.S. government's Environmental Protection Agency (EPA), require many home network devices to reduce their power consumption (e.g., to 1 watt or less) when they are not performing their nominal device functions. It is very difficult, however, for a network master node to enter into a power management mode while it is performing network administrative functions but not performing its own nominal device functions. As a result, the total energy consumption of conventional home networks undesirably tends to be the same regardless of whether or not the network master node is performing its own nominal device functions in addition to the network administrative functions. Thus, it would be advantageous to be able to turn a network master node off (or have it enter some power management mode) when the network master node is not performing its nominal device function to minimize total power consumption of the home network.

Recently, it has been proposed to provide a network system wherein a network slave node will automatically "promote" itself to become a new network master node in the event that a network master node either fails to function properly or is taken off-line. In such a system, however, it is possible that devices on the home network other than the network slave node that promoted itself into the network master role may be more qualified to be a network master than the self-promoting device. As a result, such a network system may not be optimally administered. Moreover, if no network slave nodes are available to be promoted to the network master role, then the network is lost when the network master node enters either fails or goes off-line.

Thus, it would be advantageous to minimize the total power consumption of a home network while ensuring that only the best qualified of available network slave nodes is promoted to the network master role, thereby continually maximizing the performance and administration of the home network and ensuring that the home network is not lost when the network master node enters into power save mode.

SUMMARY OF THE INVENTION

Several embodiments of the invention advantageously address the needs above as well as other needs by providing methods for transferring network administrative functions from a master device to a slave device.

One embodiment can be characterized as a method of managing power consumption in a network including receiving an instruction for a first device in an active power state and serving as a network master node to enter into a power management state, the first device adapted to perform a network administrative function while in an active power state, the power management state having a lower power consumption than the active power state; sending data from the first device to a second device serving as a network slave node, the data enabling the second device to start performing the network administrative function while in an active power state; and placing the first device into the power management state after sending the data.

Another embodiment can be characterized as a method of managing power consumption in a network including receiving a request to send data from a first device serving as a network master node to a second device serving as a network slave node, the data enabling a network administrative function to be performed, and the second device adapted to perform the network administrative function while in an active power state; sending a request reply from the second device to the first device, the request reply indicating acceptance of the request to send the data; and receiving the data at the second device.

BRIEF DESCRIPTION OF THE DRAWINGS

The above and other aspects, features and advantages of several embodiments of the present invention will be more apparent from the following more particular description thereof, presented in conjunction with the following drawings, wherein.

Corresponding reference characters indicate corresponding components throughout the several views of the drawings. Skilled artisans will appreciate that elements in the figures are illustrated for simplicity and clarity and have not necessarily been drawn to scale. For example, the dimensions, sizing, and/or relative placement of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is usually accorded to such terms and expressions by those skilled in the corresponding respective areas of inquiry and study except where other specific meanings have otherwise been set forth herein.

DETAILED DESCRIPTION

The following description is not to be taken in a limiting sense, but is made merely for the purpose of describing the general principles of exemplary embodiments. The scope of the invention should be determined with reference to the claims.

Figure 1:
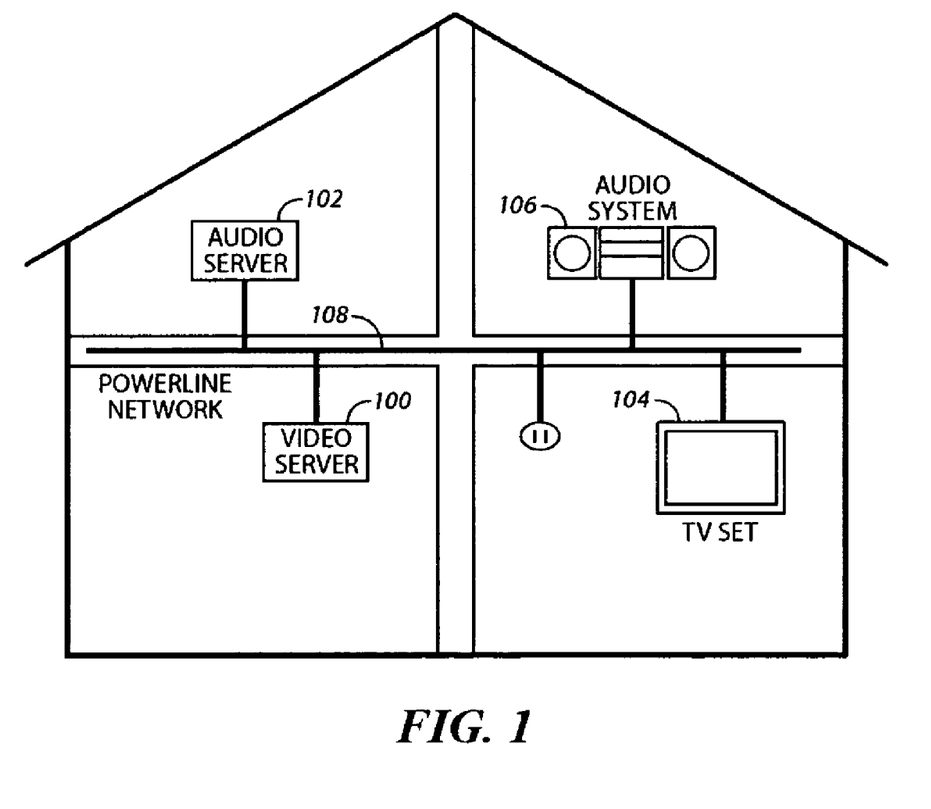
FIG. 1 is a diagram exemplarily illustrating a home powerline network in accordance with one embodiment.

Referring to FIG. 1, a home network according to principles of several embodiments of the present invention includes a plurality of devices (e.g., a video server 100, an audio server 102, a video system 104, and an audio system 106) communicatively coupled to each other via a network medium 108 and each capable of performing specific nominal device functions.

A nominal device function of the video server 100 includes, for example, the ability to stream video and audio data to the video system 104 (e.g., provided as a television set) that has a nominal device function including, for example, the ability to communicate sound and images to a user. Similarly, a nominal device function of the audio server 102 includes, for example, the ability to stream audio data to the audio system 106 (e.g., provided as a stereo) that has a nominal device function including, for example, the ability to communicate sound to a user.

The network medium 108 is, for example, a powerline network, a wired or wireless network, a local area network, an Ethernet network, or a wireless network based upon the 802.11 standard.

Figure 2:
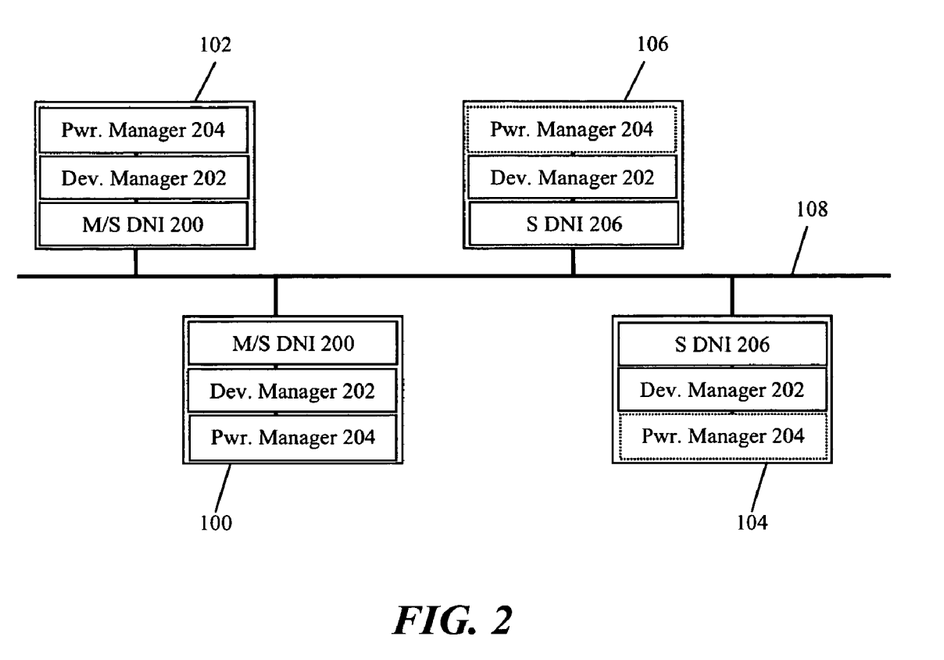
FIG. 2 is a functional block diagram illustrating relationships between nodes of the network in accordance with several embodiments.

Referring to FIG. 2, and in accordance with various embodiments, the home network is implemented as a master/slave network, wherein one or more or all of the devices coupled to the network medium 108 are capable of serving as a "network master node" while all of the devices coupled to the network medium 108 are capable of serving as a "network slave node." For example, the aforementioned video server 100 and audio server 102 are capable serving as both network master and slave nodes while the video system 104 and audio system 106 are capable of serving only as network slave nodes. In one embodiment, only one of the devices coupled to the network medium 108 can actually serve as the network master node at any time. Each device capable of serving as both a network master and slave node includes a master/slave (M/S) device-network-interface (DNI) 200, a device manager 202, and a power manager 204. Each device capable of serving only as a network slave node includes a slave DNI 206 in addition to the aforementioned device and power managers 202 and 204, respectively.

Within the context of the illustrated home network, the network master node performs network administrative functions in addition to its nominal device functions. Network administrative functions are those that enable a network master node to control the transmission of data over the network medium 108, and to instruct each network slave node coupled to the network medium 108 where to find another network slave node. For example, network administrative functions that a network master node can perform include beacon transmission (network access is based on beacon timing), device association and authentication, admission control, and bandwidth assignment and communication with other network master nodes in neighboring networks. In one embodiment, the network master node periodically broadcasts a beacon to each device serving as a network slave node. In one embodiment, the network master node performs device association and authentication by maintaining a list of devices registered on the network, if a new device is added, a device ID for the new device is provided to the network master node (e.g., by a user). In one the network master node manages all traffic on the network. Therefore, when a network slave node needs to begin streaming data, the network slave node must ask the network master node to assign enough network bandwidth to enable the data streaming. If enough bandwidth is available, the network master node assigns the necessary bandwidth to the particular network slave node. Accordingly, devices capable of serving as network master nodes must have sufficient processing power and memory to perform the aforementioned network administrative functions for the entire network.

The M/S DNI 200 includes circuitry enabling a device serving as a network master node to perform the aforementioned network administrative functions as well as communicatively coupling the device manager 202 to other devices on the home network. In one embodiment, the device manager 202 controls the performance of nominal functions of its respective device. The power manager 204 of a particular device is coupled its respective device manager to manage the power consumption of its respective device. The slave DNI 206 essentially identical to the M/S DNI 200 except that the slave DNI 206 does not include circuitry enabling the device to perform the aforementioned network administrative functions.

Figure 3:
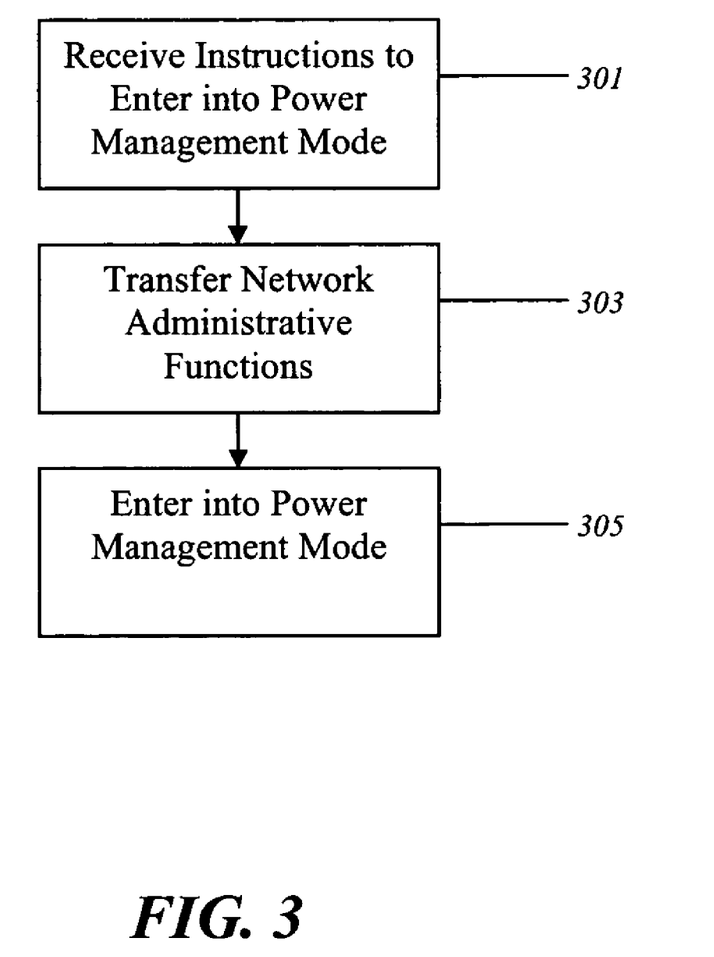
FIG. 3 is a simplified flow diagram illustrating an operation of a network master node in accordance with one embodiment.

Referring next to FIG. 3, a simplified flow diagram is shown illustrating an operation of a network master node in accordance with one embodiment.

At step 301, a device currently serving as a network master node (herein referred to as the "network master node") receives instructions to enter into a power management mode (e.g., a power save mode). It will be appreciated that the network master node may be instructed to enter into the power save mode for any number of reasons (e.g., the particular device is no longer performing, has been instructed to stop performing, or no longer required to perform its nominal device functions). Subsequently, at step 303, the network master node sends data enabling the aforementioned network administrative functions to be performed to a device currently serving as a network slave node (herein referred to as the "network slave node"). By sending the data from the network master node to the network slave node, the network administrative functions are conceptually transferred from the network master node to the network slave node. After the network administrative functions have been transferred, the master network node of step 301 enters into the power management state in step 305 and the network slave node that received the network administrative functions becomes the new network master node. By providing a means for transferring the network administrative functions from a network master node to a network slave node, the total power consumption of the home network may be minimized while ensuring that the administrative functions of the network are performed by another device.

Figure 4:
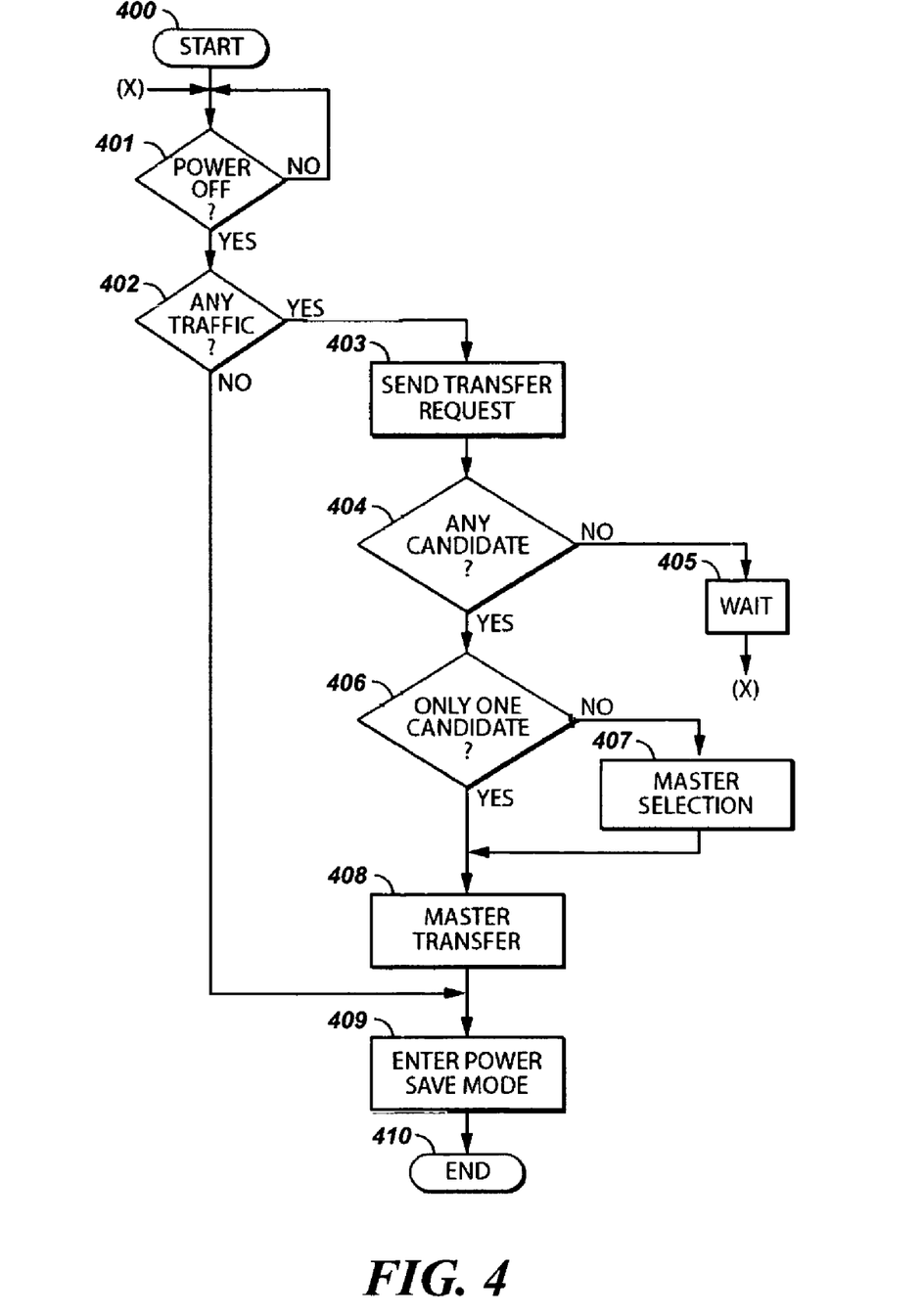
FIG. 4 is a flow diagram illustrating a detailed operation of a network master node in accordance with one embodiment.

Referring next to FIG. 4, a flow diagram is shown illustrating a detailed operation of a network master node in accordance with one embodiment.

In operation, the process starts at step 400. In step 401, the network master node is instructed to enter into power save mode (e.g., a user presses a button).

In step 402, before entering into power save mode, the network master node determines if there is any traffic on the network medium 108 (e.g., the network master node determines if any network slave nodes are operating). If no traffic is found, the network master node enters power save mode in step 409 and the process ends at step 410. If traffic is found, the network master node sends (e.g., broadcasts) a transfer request to the network slave nodes at step 403. In one embodiment, the transfer request simply solicits any currently active devices to announce their ability to assume network master administrative functions. In another embodiment, the transfer request includes the network address of the current network master node.

Next in step 404, the network master node determines whether any network slave nodes have responded to the transfer request. In one embodiment, such a determination can be made by receiving a request reply message transmitted to the network master node by a slave network device. In one embodiment, the request reply message includes the network address of the accepting network slave node. When no network slave node has responded to the transfer request, the network master node waits for a predetermined period of time (e.g., about 500 ms, one minute, etc.) at step 405 and then returns to step 401. When it is determined that the transfer request has initiated a response by the network slave nodes, the master device determines how many network slave nodes have responded in step 406 (e.g., by counting the number of request reply messages received). When the network master node determines that the transfer request has initiated a response by only one network slave node, the network master node sends data enabling the aforementioned network administrative functions to be performed to the sole responding network slave node (step 408). As discussed above, by sending the data from the network master node to the responding network slave node, the network administrative functions are conceptually transferred from the network master node to the network slave node. In one embodiment, the data includes any information that allows the network master node to perform the network administrative functions or includes an instruction for a network slave node to generate such information. For example, the data includes the list of registered devices, network addresses of the devices, bandwidth management information, time allocation information, etc. Subsequently, the master network node enters into power save mode in step 409.

When the master device determines that more than one network slave node has accepted the transfer request, the network master node selects a network slave node to transfer the network administrative functions to in step 407. According to principles of many embodiments, the network master node selects a particular network slave node to transfer the network administrative functions to in accordance with predetermined selection criteria. In one embodiment, the selection criteria is based on the visibility of a particular network slave node on the network. In this case, the request reply messages transmitted by the network slave node further include the number of devices that that particular network slave node "sees" on the network medium 108 and can, therefore, communicate with. Accordingly, the master network device can select the network slave node that has the highest visibility of accepting network slave nodes on the network.

In another embodiment, the selection criteria is based on the intelligence/functional capabilities of a particular network slave node on the network. In this case, the request reply messages transmitted by each network slave node further includes a vendor-assigned classification indicating how intelligent or functional that particular network slave node is. "Intelligence" represents processing power, speed, etc., while "functional capability" represents transmission bandwidth, speed, etc. Accordingly, the master network device can select the network slave node that has the highest intelligence or functional capabilities of accepting network slave nodes on the network. It will be appreciated, however, that the network master node can select a particular network slave node to transfer the network administrative functions to according to a combination of the aforementioned visibility- and intelligence/functional capability-based selection criteria.

In yet another embodiment, the network master node can select a particular network slave node that has been specifically selected by a user to become the new network master node.

After the master network device has selected the slave device in step 407, the master network device transfers the network administrative functions to the selected slave network device in step 408 whereby the selected slave network device becomes the new master network device and the old master network device enters into power save mode in step 409. The process ends at step 410.

According to the various embodiments of the present invention, the network administrative function is transferred to the slave network device while the slave network device is performing its own nominal device functions. In another embodiment however, the network administrative function is transferred to the slave network device intermittently with the network slave node's performance of its own nominal device functions. In yet another embodiment, the network administrative function is transferred to the slave network device after the network slave node has performed its own nominal device functions (e.g., when the nominal device functions include streaming audio/video information).

Figure 5:
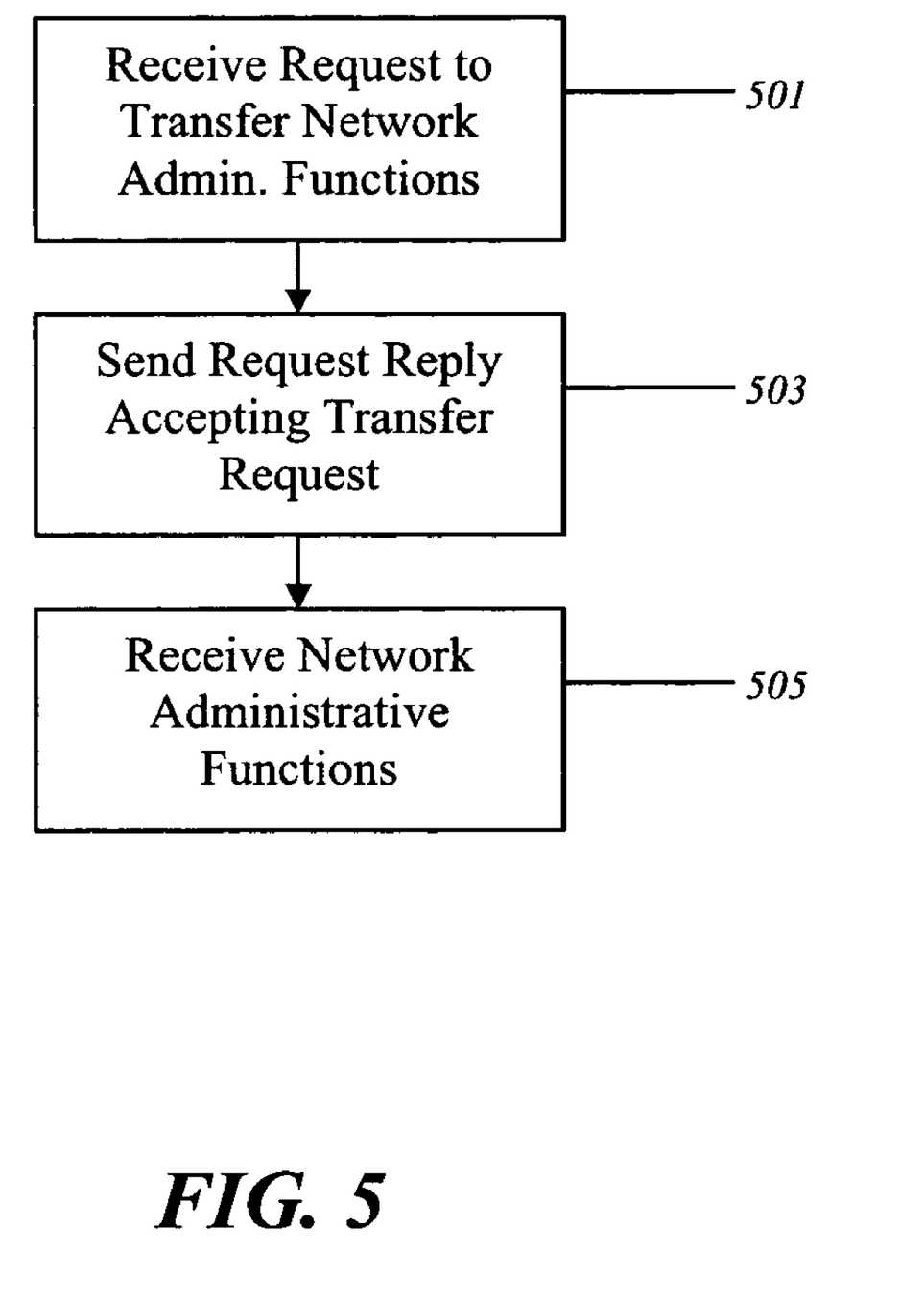
FIG. 5 is a simplified flow diagram illustrating an operation of a network slave node in accordance with one embodiment.

Referring next to FIG. 5, a simplified flow diagram is shown illustrating an operation of a network slave node in accordance with one embodiment.

At step 501, a device currently serving as a network slave node (herein referred to as the "network slave node") receives a request to transfer a network administrative function from a device serving as a network master node for the network slave node to accept. Subsequently, at step 503, the network slave node sends a request reply to the network master node, indicating that it will accept the transfer of the network administrative functions. Subsequently, at step 505, the network slave node receives the transferred network administrative functions to become the new network master node.

Figure 6:
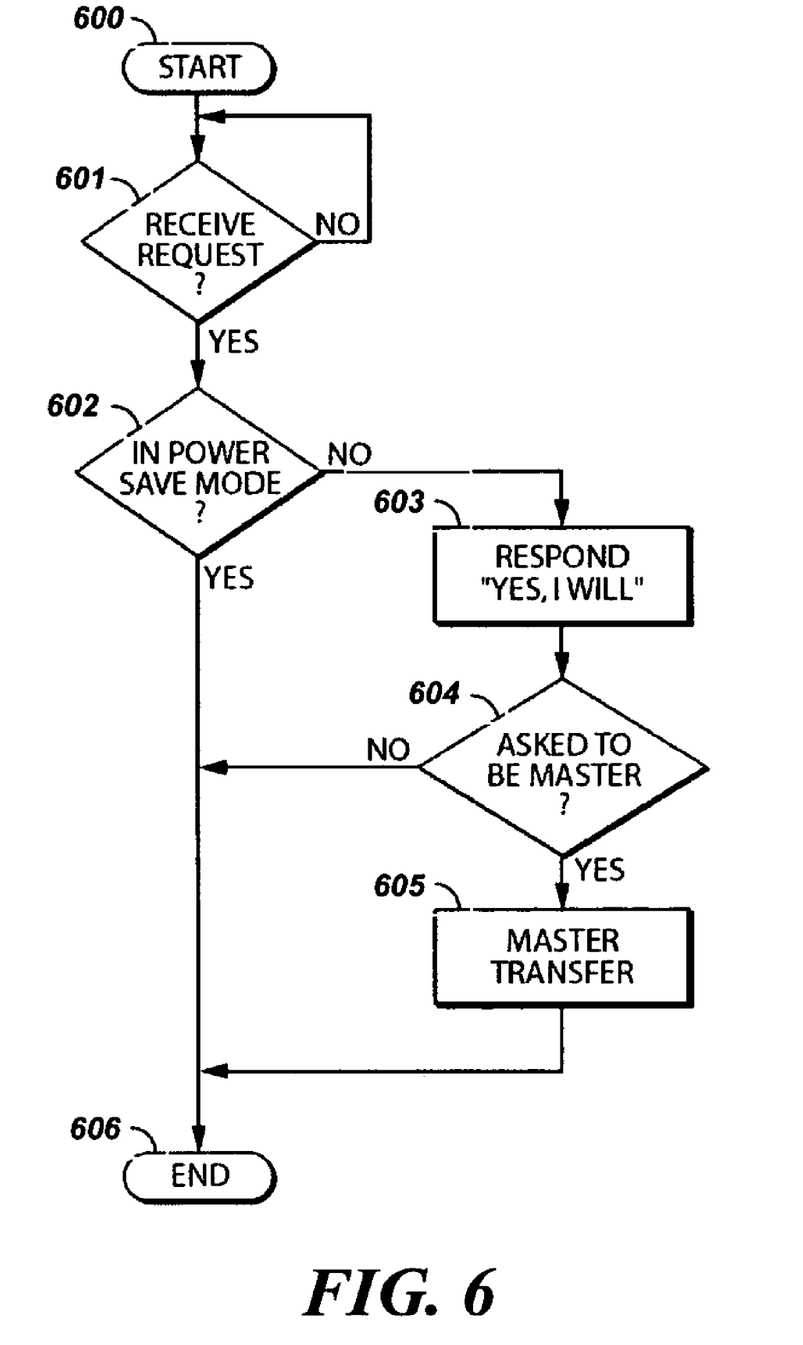
FIG. 6 is a flow diagram illustrating a detailed operation of a network slave node in accordance with one embodiment.

Referring next to FIG. 6, a flow diagram is shown illustrating a detailed operation of a network slave node in accordance with one embodiment.

In operation, the process starts at step 600. In step 601, the network slave node waits for a transfer request from a master network device. Upon receipt of a transfer request, the particular network slave node determines if it is in a power save mode at step 602. Network slave nodes in power save mode do not accept transfer requests and, therefore, do not transmit request reply messages as discussed above. In such a case, the process ends at step 606. When the particular network slave node is not in a power save mode (e.g., when the particular network slave node is performing its nominal device function), then the particular network slave node accepts the transfer request by transmitting request reply message to the master network device at step 603. At step 604, the slave network device then determines whether it has been selected by the master network device to be the new master network device. If the particular slave network device has not been selected by the master network device to be the new master network device, then the process ends at step 606. If the particular slave network device has been selected by the master network device to be the new master network device, then the network administrative functions are transferred from the network master node to the particular slave network device at step 605 and the process ends at step 606. In one embodiment, aforementioned selection and transfer process is completed within, for example, a few tens of milliseconds. If, for some reason, the network administrative functions are not transferred (e.g., because the current network master node is unplugged), then a suitable network slave node will self-promote itself to the network master node role.

Generally, when any device coupled to the network medium 108 (including a previous master network device that has entered into power save mode) becomes activated (e.g., when a device is initially turned on or exits power save mode), it first checks for the presence of beacons on the network. When no beacon is found, the activated device concludes that there is no network master node on the home network, automatically becomes the network master node, generates information necessary to perform the aforementioned network administrative functions, and performs the aforementioned network administrative functions in addition to its nominal device function. However, when beacons are found on the network, the activated device simply becomes a network slave node and performs its nominal device functions.

While the invention herein disclosed has been described by means of specific embodiments, examples and applications thereof, numerous modifications and variations could be made thereto by those skilled in the art without departing from the scope of the invention set forth in the claims.

What is claimed is:

1. A method of managing power consumption in a home network, comprising:
   providing a home network having a network master node and at least one network slave node, the network master node and the at least one network slave node being capable of performing a nominal device function and a network administrative function;
   receiving an instruction for a first device in an active power state that is performing a network administrative function, and not performing a nominal device function, and that is serving as a network master node to enter into a power management state, the first device adapted to perform a network administrative function while in an active power state, the power management state having a lower power consumption than the active power state;
   transmitting a network administrative function transfer request to devices serving as network slave nodes on the network;
   determining whether the transmitted network administrative function transfer request has been accented by a second device serving as a network slave node;
   sending the data to the second device serving as a network slave node determined to have accented the network administrative function transfer request if the second device comprises a best qualified network slave node, the data enabling the second device to start performing the network administrative function while in an active power state; and
   placing the first device into the power management state after sending the data, thereby reducing a total energy consumption of the home network.

2. The method of claim 1, further comprising determining whether any traffic exists on the network in response to the received instruction.

3. The method of claim 1, further comprising sending data when the second device is in an active power state.

4. The method of claim 1, wherein determining whether the transmitted network administrative function transfer request has been accepted by a device serving as a network slave node includes receiving a request reply from a device serving as a network slave node.

5. The method of claim 4, further comprising:
   selecting from one of a plurality devices serving as network slave nodes to send the data to when it is determined that a plurality of devices serving as network slave nodes have accepted the network administrative function transfer request; and
   sending the data to the selected device serving as a network slave node.

6. The method of claim 5, wherein selecting from one of the plurality of devices serving as network slave nodes includes selecting a device having the highest visibility of devices serving as network slave nodes that accepted the network administrative function transfer request.

7. The method of claim 5, wherein selecting from one of the plurality of devices serving as network slave nodes includes selecting a device having at least one of the highest intelligence and functional capabilities of devices serving as network slave nodes that accepted the network administrative function transfer request.

8. The method of claim 5, wherein selecting from one of the plurality of devices serving as network slave nodes includes selecting a device assigned by a user.

9. The method of claim 1, further comprising sending the data from the first device to the second device while the second device performs a nominal device function independent of the network administrative function.

10. The method of claim 1, further comprising sending the data from the first device to the second device intermittently with the second device performing a nominal device function independent of the network administrative function.

11. The method of claim 1, further comprising sending the data from the first device to the second device after the second device performs a nominal device function independent of the network administrative function.

12. A method of managing power consumption in a home network, comprising:
   providing a home network having a network master node and at least one network slave node, the network master node and the at least one network slave node being capable of performing a nominal device function and a network administrative function;
   receiving a request to send data from a first device serving as a network master node and performing a network administrative function, and not performing a nominal device function, to a second device serving as a network slave node, the data enabling a network administrative function to be performed, and the second device adapted to perform the network administrative function while in an active power state;
   sending a request reply from the second device to the first device, the request reply indicating acceptance of the request to send the data;
   determining if the second device comprises a best-qualified available network slave node;
   receiving the data at the second device;
   placing the first device into the power management state after receiving the data by the second device, thereby reducing a total energy consumption of the home network.

13. The method of claim 12, further comprising:
   determining whether the second device is in a power management state having a lower power consumption than the active power state; and
   sending the request reply after determining that the second device is not in a power management state.

14. The method of claim 12, wherein the request reply includes a device address of the second device.

15. The method of claim 12, wherein the request reply indicates the visibility of the second device on the network.

16. The method of claim 12, wherein the request reply indicates at least one of the intelligence and functional capability of the second device.

17. The method of claim 12, further comprising receiving the data at the second device while the second device performs a nominal device function independent of the network administrative function.

18. The method of claim 12, further comprising receiving the data at the second device and performing a nominal device function of the second device intermittently, wherein the nominal device function is independent of the network administrative function.

19. The method of claim 12, further comprising receiving the data at the second device after the second device performs a nominal device function independent of the network administrative function.

* * * * *

UNITED STATES PATENT AND TRADEMARK OFFICE
CERTIFICATE OF CORRECTION

PATENT NO. : 7,624,290 B2  Page 1 of 1
APPLICATION NO. : 11/231488
DATED : November 24, 2009
INVENTOR(S) : Iwamura et al.

It is certified that error appears in the above-identified patent and that said Letters Patent is hereby corrected as shown below:

In the CLAIMS:
Claim 1, column 7, line 43, delete "accented" and insert --accepted--.
Claim 1, column 7, line 46, delete "accented" and insert --accepted--.
Claim 5, column 7, line 66, after "plurality" insert --of--.
Claim 12, column 8, line 53, after "device" insert --and--.

Signed and Sealed this

Thirteenth Day of April, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,624,290 B2 | Page 1 of 1 |
| APPLICATION NO. | : 11/231488 | |
| DATED | : November 24, 2009 | |
| INVENTOR(S) | : Ryuichi Iwamura et al. | |

It is certified that error appears in the above-identified patent and that said Letters Patent is hereby corrected as shown below:

Title Page,

(*) Notice: Subject to any disclaimer, the term of this patent is extended or adjusted under 35 U.S.C. 154(b) by 479 days.

should read (*) Notice: Subject to any disclaimer, the term of this patent is extended or adjusted under 35 U.S.C. 154(b) by 855 days.

Signed and Sealed this

Fourteenth Day of September, 2010

David J. Kappos
*Director of the United States Patent and Trademark Office*